J. HAWK & J. MILLER.
Thrashing Machine.

No. 235,631.  Patented Dec. 21, 1880.

Attest,
W. H. H. Knight
W. Blackstock

Inventor,
Jacob Hawk & Jacob Miller,
By E. A. Ellsworth
Their Attorneys

4 Sheets—Sheet 4.

J. HAWK & J. MILLER.
Thrashing Machine.

No. 235,631. Patented Dec. 21, 1880.

Attest
W. H. H. Knight
W. Blackstock.

Inventor,
Jacob Hawk & Jacob Miller,
By A. A. Alesworth
Their Attorney.

UNITED STATES PATENT OFFICE.

JACOB HAWK AND JACOB MILLER, OF CANTON, OHIO, ASSIGNORS TO
C. AULTMAN & CO., OF SAME PLACE.

THRASHING-MACHINE.

SPECIFICATION forming part of Letters Patent No. 235,631, dated December 21, 1880.

Application filed July 22, 1879.

*To all whom it may concern:*

Be it known that we, JACOB HAWK and JACOB MILLER, both of Canton, in the county of Stark and State of Ohio, have invented certain new and useful Improvements in Thrashing-Machines for Grain and Clover-Seed; and we do hereby declare the following to be a full, clear, and exact description of the invention, sufficient to enable others skilled in the art to which our invention appertains to make and use the same, reference being made to the accompanying drawings, forming part of this specification, in which—

Figure 1:
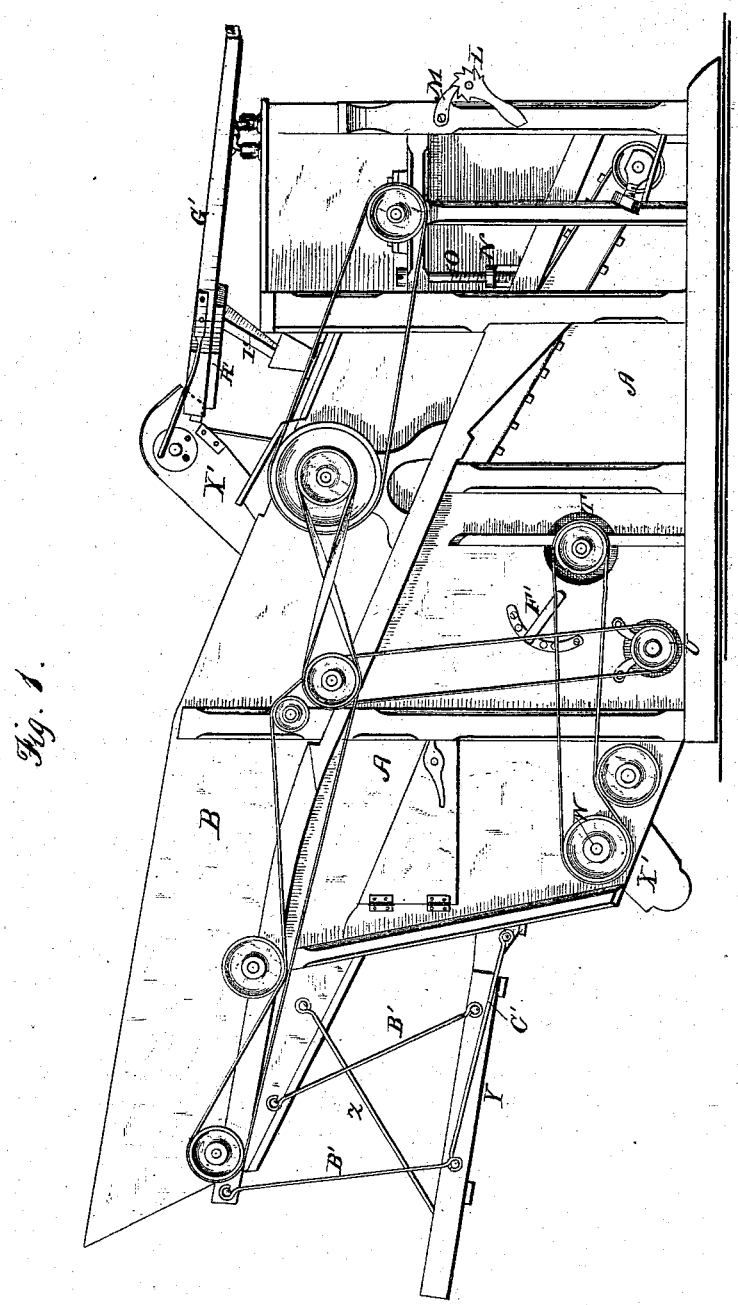
Figure 2:
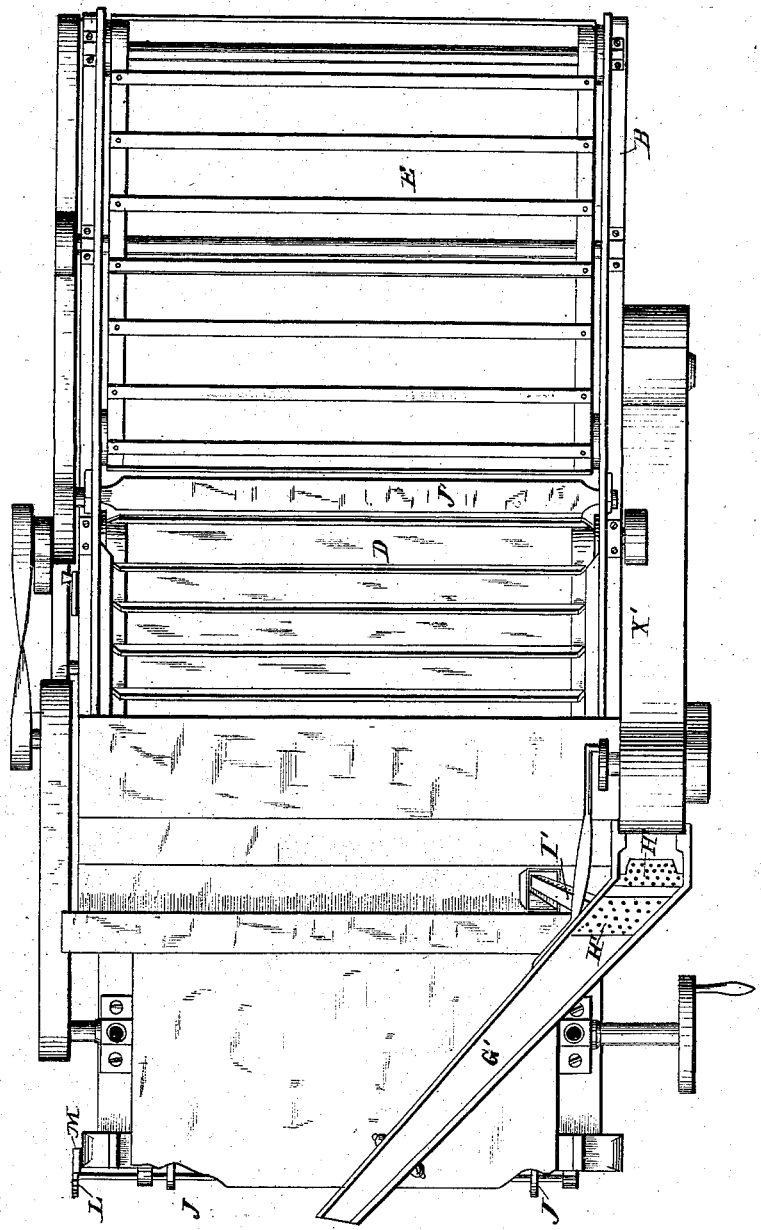
Figure 3:
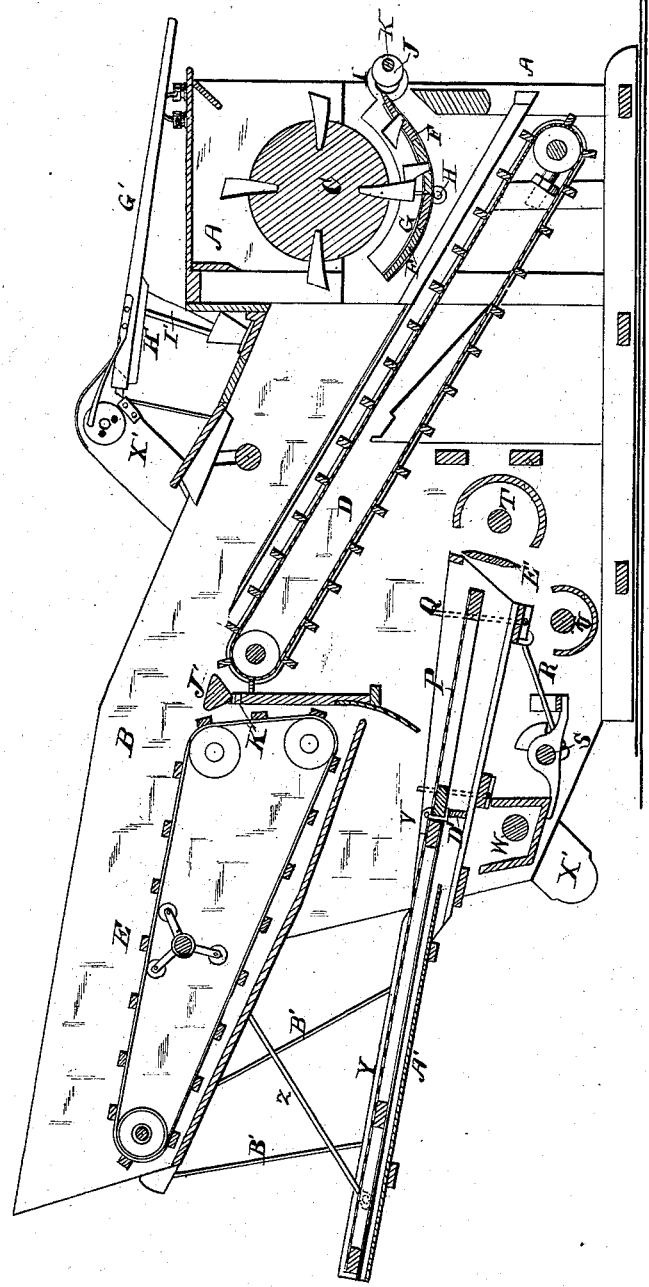
Figure 4:
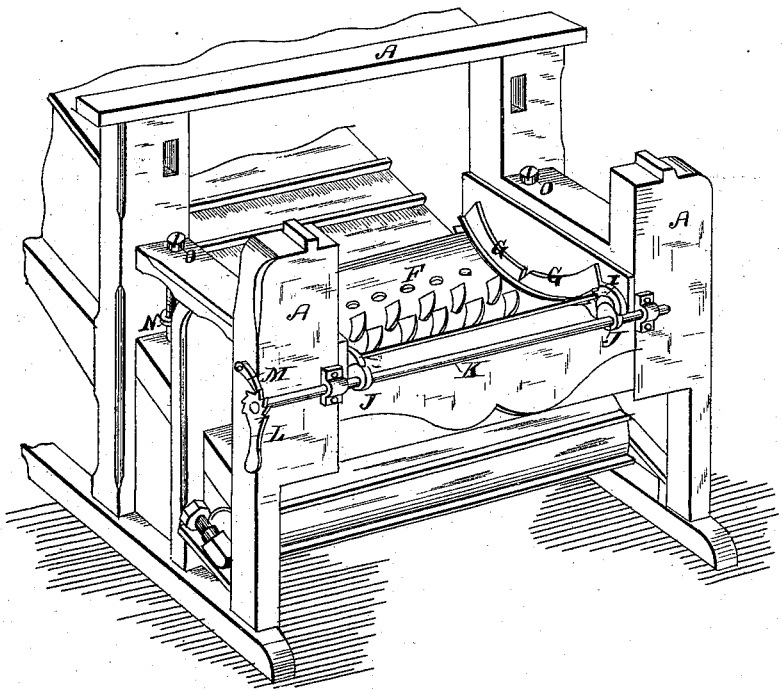

Figure 1 is a side elevation of a thrashing-machine provided with our improvements. Fig. 2 is a top-plan view. Fig. 3 is a vertical longitudinal section, and Fig. 4 is a perspective view of the thrasher, partly broken away to show the interior.

Similar letters of reference in the accompanying drawings denote the same parts.

Our invention has for its object to improve that class of thrashing-machines which are adapted to receive attachments for hulling clover-seed; and to this end it consists, first, in the construction and application of the concave by which it is adapted to the most effective work in thrashing grain and in hulling clover-seed.

It also consists in the combination of an extension-riddle and shoe with the grain-separator, to which a longitudinal as well as a rising-and-falling movement is imparted by suitable means, for the purpose of feeding the straw out of the machine and the seed and tailings back into the machine without the aid of a wind-blast.

It also consists in a check-board placed in the end of the grain-shoe over the tail-conveyer, for the double purpose of preventing the seed from blowing over and the blast from striking on or against the return-shoe to retard the backward passage of the seed and tailings into the machine.

It also consists in the provision of means for preventing the straw from wrapping around the pickers and beaters.

In the accompanying drawings, A represents the frame-work of the thrashing-machine, and B the separator, constructed in the usual manner, the former provided with the thrashing-cylinder C and the latter with the customary straw-carriers D E.

The thrashing-concave is composed of several toothed plates or slides, F F, inserted in end guide-plates, G G, attached to the inner walls of the cylinder-case under the cylinder, as shown. The guide-plates on each side are made in two parts and hinged together by a rod, H, which passes through the frame, thus permitting the outer edges of the guide-plates to rise and fall. The outer guide-plate on each side is formed with a forked end, I, to receive a cam, J, mounted on a cross-rod, K, having its bearings on the front of the frame. The rod is provided with a handle, by which it is turned, so that the cams shall swing the outer guide-plates to and from the front side of the cylinder. The rod also carries a ratchet, L, with which a pawl, M, in the frame engages, to lock the shaft against turning and hold the guide-plates at the point of adjustment. The rear guide-plates are each provided with a lug, N, projecting through the framing, to receive long screws O, by the operation of which these plates are adjusted to and from the rear side of the cylinder.

The concave slides for thrashing grain are slipped into the guide-plates from the front side, terminating under the center of the cylinder substantially, and may be one or more in number; but when it is desired to thrash or hull clover-seed, one or more concave slides are inserted in the guide-plates from the rear, so as to form a continuation of the whole concave. These latter slides may be called "supplemental," concave at the rear discharging end of the usual concave, and form a removable extension thereof, for adapting the machine to the thrashing and hulling of clover-seed. By this means we are enabled to connect the ordinary grain-thrashing machine with a clover-huller very quickly, and to adapt it to all the conditions of the seed to be operated upon. The independent adjustment of the separate sections of the concave to and from the cylinder enables the clover to be held for a longer or shorter time up to the action of the cylinder, according to the degree of thrashing required. The concave plates are held in place in any suitable manner, preferably by a pin on each side of the rear uppermost slide.

P is the separator-shoe, suspended at its rear end by a bent rod or links, Q, from the sides of the separator, and driven by a pitman, R, from a transverse crank-shaft, S, at the rear of the machine, as shown in Fig. 3. T is the fan and its case. U is the conveyer for discharging from the machine the grain or seed which falls from the shoe, and W is the conveyer for conveying the seed and tailings from the supplemental riddle to the elevator X. Y is the extension-riddle, hung at its rear end to the outer end of the separator-shoe, or in the sides thereof near the end, as shown at V, and connected at its outer end to the sides of the separator above by means of pivoted links or rods Z Z.

When the separator-shoe is reciprocated its outward movement throws the riddle forward longitudinally, and the pivoted links cause its outer end to rise. On the return-stroke the links swing down, and therefore cause the outer end of the riddle to drop. These movements serve to pitch forward the straw, which falls upon the riddle, and allows the seed to fall through onto a return-shoe, A'. This shoe is suspended, by two rods, B' B', on each side, from the separator-frame above, and its rear end passes into the end of the separator-shoe P, the two shoes being connected together by the pivoted side links, C'. On the outward movement or throw the shoe A' descends a little, thus carrying the seed downward. On the backward throw it moves with a quick action, and throws the seed backward into the separator-shoe. Thus, without the aid of a wind-blast, the riddle pitches forward the straw and chaff out of the machine, while the return-shoe A' pitches backward the seed and tailings that riddle through onto it, and passes them back into the machine.

D' is a transverse check-board placed in the forward end of the grain-separator shoe over the tail-conveyer. This board serves two purposes—to wit, first, to prevent any of the seed from being blown over the tail-conveyer, and, secondly, to prevent the wind from the fan from blowing onto and against the return-shoe to retard the passage of the seed back into the machine; but while it cuts off the wind from the return-shoe, it does not obstruct, but rather directs, its passage upward through the riddle of the separator-shoe.

Between the fan and separator-shoe there is hung a wind-board, E', the journals of which have their bearings in the sides of the separator, one passing entirely through to receive an adjusting-arm, F'. (Shown in Fig. 1.) By adjusting the wind-board the blast from the fan is directed onto the separator-shoe, so as to rise equally through the whole length of the main riddle and clean the seed thoroughly, such adjustment also serving, when necessary, to change the direction of the blast.

G' is the spout for conveying the unthrashed seed from the elevator to the cylinder, a reciprocating motion being imparted to it in the usual manner. In order to prevent the good seed, which passes up the elevator with the tailings and unhulled or unthrashed seed, from being broken by the second thrashing of the cylinder, we provide the spout G' with one or more screens, H', through which the good seed passes into the machine back of the cylinder, being conveyed by a short spout, I', and escapes being injured by the cylinder when acting upon the unthrashed returns.

In thrashing-machines at present in use much difficulty is experienced by the wrapping or winding of the straw around the beaters between the straw-conveyers, and thus retarding the passage of the straw out of the machine. To overcome this difficulty we place under the pickers or beaters J' leather, rubber, or other elastic or pliable strips, K', one or more, stretched from the sides of the separator, so as to bear against the beaters. This constantly wipes the latter as they revolve, and effectually prevents the straw from winding around them.

The machine is driven, in the usual manner, by belts and pulleys, power being applied to the shaft of the cylinder.

The various improvements above described are, in general, applicable to machines for thrashing grain as well as merely clover-seed, and any or all of them may be so used, with the exception of the extension-concave, which will be found unnecessary.

Having thus described our invention, what we claim as new, and desire to secure by Letters Patent, is—

1. The combination, with the cylinder, of the hinged guide-plates G G, rod I, and removable toothed plates F F, constructed as described, to form two concave wings whose outer edges are separately and independently adjustable to and from the cylinder in front and rear thereof, and whose adjoining edges are non-adjustable to and from the cylinder, but turn on the rod, substantially as described, for the purpose specified.

2. In combination with the longitudinally-vibrating separator-shoe P, the extension-riddle Y, hinged thereto and adapted to receive a vertical vibration in connection with its horizontal reciprocation, substantially as described, for the purpose specified.

3. The combination, with the longitudinally-moving shoe P, of the extension-riddle Y, hinged at its inner end to the rear of said shoe and suspended at its outer end by the inclined links Z, substantially as described, for the purpose specified.

4. The return-shoe A', combined with the separator-shoe and the extension-riddle, and suspended by the unequally-inclined rods or links B' B', substantially as described, for the purpose specified.

5. In combination with the separator-shoe and the extension-riddle, the return-shoe, connected to the separator-shoe by the links C' and to the separator-frame by links B' B', so as to have a movement of its own relatively to the separator-shoe, substantially as described, for the purpose specified.

6. The check-board D', interposed between the separator-shoe and the extension-riddle and return-shoe, substantially as described, for the purpose specified.

7. The combination of the yielding wiper K' with the pickers or beaters J', substantially as described, for the purpose specified.

In testimony of which invention we have hereunto set our hands this 2d day of May, A. D. 1879.

JACOB HAWK.
JACOB MILLER.

Witnesses:
DANIEL TONNER,
N. K. ELLSWORTH.